United States Patent
Park et al.

(10) Patent No.: US 8,117,377 B2
(45) Date of Patent: Feb. 14, 2012

(54) FLASH MEMORY DEVICE HAVING SECURE FILE DELETION FUNCTION AND METHOD FOR SECURELY DELETING FLASH FILE

(75) Inventors: Seungmin Park, Daejeon (KR); Jaemyoung Kim, Daejeon (KR); Yungjoon Jung, Daejeon (KR); Donghyouk Lim, Daejeon (KP); Youngbin Seo, Daejeon (KR); Yookun Cho, Seoul (KR); Sangho Yi, Seoul (KR); Jaeheung Lee, Seoul (KR); Seokhyun Kim, Seoul (KR); Jinha Oh, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 636 days.

(21) Appl. No.: 12/256,331

(22) Filed: Oct. 22, 2008

(65) Prior Publication Data
US 2009/0172265 A1    Jul. 2, 2009

(30) Foreign Application Priority Data

Dec. 27, 2007  (KR) .................. 10-2007-0138650
Sep. 18, 2008  (KR) .................. 10-2008-0091545

(51) Int. Cl.
*G06F 12/00* (2006.01)
(52) U.S. Cl. ........................................ 711/103
(58) Field of Classification Search .............. None
See application file for complete search history.

(56) References Cited

U.S. PATENT DOCUMENTS

| | | | |
|---|---|---|---|
| 5,832,493 A | | 11/1998 | Marshall et al. |
| 5,896,393 A | * | 4/1999 | Yard et al. .................. 714/710 |
| 6,038,636 A | * | 3/2000 | Brown et al. ................ 711/103 |
| 2006/0075258 A1 | * | 4/2006 | Adamson et al. ............ 713/189 |
| 2006/0262682 A1 | * | 11/2006 | Hattori et al. .............. 369/47.12 |
| 2007/0116287 A1 | * | 5/2007 | Rasizade et al. ............ 380/258 |

FOREIGN PATENT DOCUMENTS

| | | |
|---|---|---|
| KR | 100251636 B1 | 1/2000 |
| KR | 1020010037155 A | 5/2001 |
| KR | 1020040044023 A | 5/2004 |

OTHER PUBLICATIONS

Peter Gutmann, "Secure Deletion of Data from Magnetic and Solid-State Memory," The proceedings of the Sixth USENIX Security Symposium, San Jose, CA, Jul. 22-25, 1996.
Jaeheung Lee et al., "Secure Deletion for NAND Flash File System," KIIS 2007 Fall Conference Korean Institute of Information Scientists and Engineers, Oct. 26-27, 2007.

* cited by examiner

*Primary Examiner* — Hiep Nguyen

(57) ABSTRACT

Disclosed is a flash memory device having a secure flash file deletion function and a method for securely deleting a flash file. Data and object headers as actual contents of the flash file are separately stored in data blocks and header blocks. At this time, the data is encrypted and stored, and a decryption key is included in an object header and stored in a header block. When the flash file is deleted, the object header is deleted by searching the header block where the object header including the decryption key is stored. In order to search the header block, a binary tree structure is used in which a terminal node indicates an LSB of a file ID. Disclosed may be applied to an embedded system where a flash memory is used as a storage medium. In particular, disclosed is suitable for a NAND flash memory device.

18 Claims, 11 Drawing Sheets

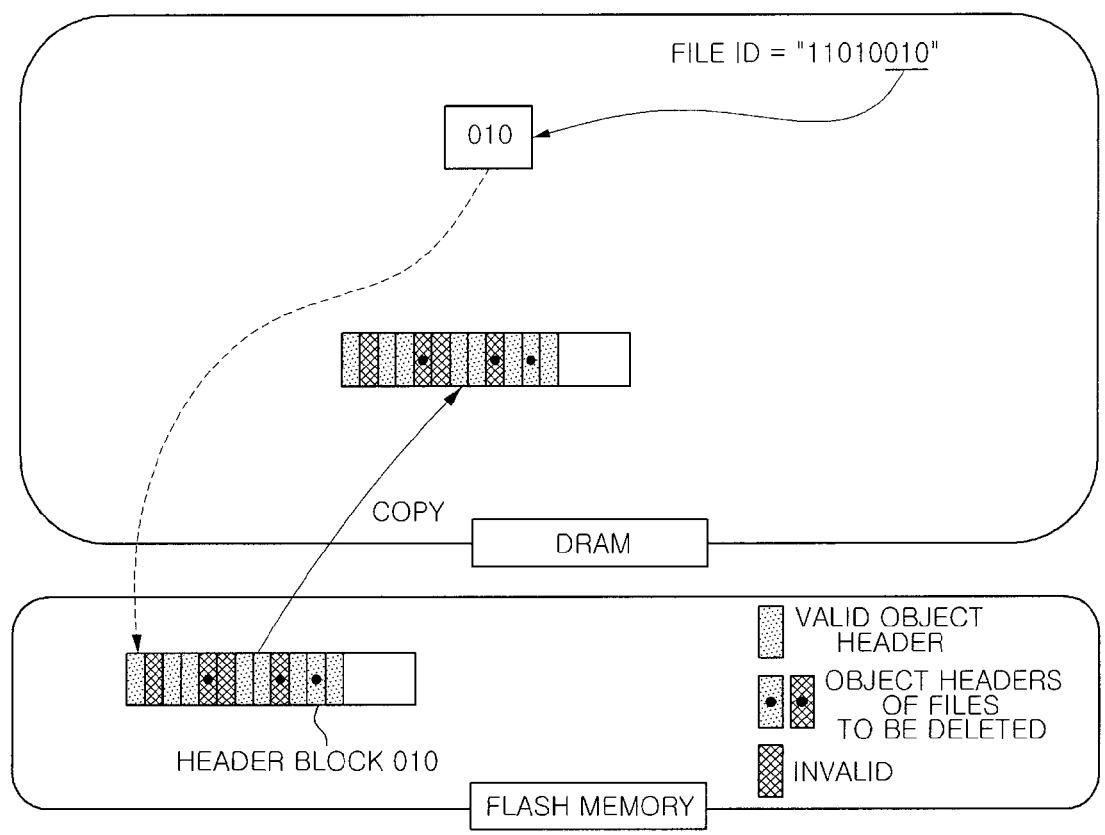

FLASH MEMORY DEVICE HAVING SECURE FILE DELETION FUNCTION AND METHOD FOR SECURELY DELETING FLASH FILE

RELATED APPLICATIONS

The present application claims priority to Korean Patent Application Serial Number 10-2007-0138650, filed on Dec. 27, 2007 and Korean Patent Application Serial Number 10-2008-0091545, filed on Sep. 18, 2008, the entirety of which are hereby incorporated by reference.

BACKGROUND OF THE INVENTION

1. Field of the Invention

The present invention relates to a flash memory device and a method for deleting a flash file, and more particularly, to a flash memory device having a secure file deletion function and a method for securely deleting a flash file.

This work was supported by the IT R&D Program of MIC/IITA [2006-S-039-02, Embedded Secure Operating System Technology Development].

2. Description of the Related Art

In most file systems, metadata for a file is deleted or changed according to a file deletion command, but the data of the file still remains in a physical medium without being deleted. Accordingly, it is possible to recover an erased file. However, in some cases, a user may not desire to recover the erased file. This demand has increased in an embedded system that uses a flash memory as a storage medium.

A method of securely deleting data in a magnetic recording medium has been known. This method uses a method in which another bit pattern is overwritten in data to delete the corresponding data. Specifically, this method includes a process of overwriting random bit patterns in data four times, a process of overwriting predetermined patterns in the data twenty-seven times, and a process of overwriting random bit patterns in the data four times. Accordingly, overwriting is usually performed thirty-five times.

Further, a method of securely deleting data in a magnetic disk has been suggested. In a DoD 5220 22-M method that is used in U.S. DEPARTMENT OF DEFENSE, a process of overwriting an arbitrary bit pattern in data, overwriting a complement of the arbitrary bit pattern in data, and overwriting an arbitrary bit pattern in data is repeated seven times. Accordingly, overwriting is performed twenty-one times.

In order to overwrite data written in a flash memory with another data, a deletion process needs to be first performed. A data deletion process in the flash memory is performed in a block unit and a writing process is performed in a page unit. In general, a block is composed of 32 pages each of which has a size of 512 bytes or 64 pages each of which has a size of 2048 bytes. Since the writing unit is not matched to the deletion unit, a log-structured file system is generally used for a flash file system.

In the log-structured file system, when a file is corrected, a file before correction becomes invalid without being deleted, and file contents after correction are written in a new page. Further, in the log-structured file system, the entire file system is searched to delete an invalid page, thereby realizing secure file deletion.

However, even though the above-described complicated processes are performed to delete data in a magnetic recording medium or a magnetic disk, a magnetic residual image still remains in erased data. Accordingly, even when the corresponding data is deleted using a method of overwriting another bit pattern in data, original data can be extracted using an apparatus capable of detecting marks of the weak magnetic field that still remains in the disk.

Further, the method of securely deleting data according to the related art relates to a magnetic recording medium or a magnetic disk. Accordingly, the method of securely deleting data according to the related art cannot be applied to a method of securely deleting data from a flash memory that is structurally different from the magnetic recording medium.

The method of securely deleting a file in the flash file system, that is, the log-structured file system is inefficient, because the entire file system needs to be searched to delete an invalid page.

SUMMARY OF THE INVENTION

Accordingly, it is an object of the present invention to provide a method and apparatus for quickly and securely deleting a file using encryption and management of object header blocks of files without searching the entire file system.

The present invention provides a method of securely deleting a file in a flash memory based file system. In order to achieve this object, the inventors of the present invention design a file system for a flash memory having a secure deletion function by changing YAFFS (Yet Another Flash File System) that is a most commonly used file system in an embedded system. However, the present invention is not limited to the YAFFS, and may be applied to other types of flash file systems.

The present invention is based on encryption, and realizes secure file deletion by deleting a decryption key, which is used to encrypt a specific file. Further, in the present invention, an object header that has metadata of a file including a decryption key and data as actual contents of the file are separately stored in a header block and a data block. Accordingly, only an object header to be deleted may be searched and deleted from the header block without needing to search the entire file system to delete the file, thereby considerably decreasing the time needed to delete the file. Further, the present invention provides a binary tree scheme that can easily and quickly search a file that needs to be securely deleted.

Specifically, in order to achieve the above-described objects, there is provided a flash memory device. The flash memory device includes: a flash memory that comprises memory blocks to store a flash file; and a memory controller that controls the flash memory, such that data blocks of the memory blocks store encrypted data of the flash file and header blocks thereof store object headers including a decryption key used to decrypt the encrypted data. The memory controller deletes the object headers including the decryption key used to decrypt the encrypted data from the header block, in response to a deletion command of the flash file that has the encrypted data.

In order to achieve the above-described objects, there is provided a method of securely deleting a flash file. The method includes: storing encrypted data of a flash file in data blocks of a flash memory and storing object headers, which include a decryption key used to decrypt the encrypted data, in header blocks thereof; and deleting the object headers including the decryption key used to decrypt the encrypted data from the header block, in response to a deletion command of the flash file that has the encrypted data.

According to this structure of the present invention, encrypted data and a decryption key are separately stored in memory blocks. Thus, by deleting only the decryption key, it is impossible to recover the encrypted data. Accordingly, secure deletion of the flash file can be quickly and easily achieved. In the case of the flash memory, since overhead for a deletion operation is large, even though overhead due to encryption is generated, the number of times for deleting operations is efficiently reduced.

The deleting of the object headers may includes: copying the header block, where the object headers including the decryption key are stored, to a temporary storage device; deleting the header block from the flash memory; setting the object headers including the decryption key in the copied header block as invalid; reallocating the deleted header block to the flash memory; and storing valid object header among the object headers of the copied header block in the reallocated header block.

It is preferable to store the object headers of the flash file having the same file ID in the same header block. Accordingly, even though the entire system is not searched, since all of the desired object headers can be deleted in only one header block, it is possible to quickly and securely delete a flash file. In a log-structured file system, a plurality of object headers may exist in one file, and when a file is deleted, it is required to search and delete not only valid object headers but also existing invalid object headers. According to the present invention, since the object headers for the same flash file is stored in one header block, it is possible to quickly and securely delete a file.

In the flash memory device and method for securely deleting a flash file according to the present invention, a binary tree, which is composed of nodes having binary values associated with a file ID, is used when searching a header block. Accordingly, it is possible to quickly search a header block.

According to the present invention, encrypted data and a decryption key are separately stored in memory blocks. When the encrypted data and the decryption key need to be deleted, if the only the decryption key is deleted, it is impossible to recover the encrypted data. Therefore, it is possible to quickly and securely delete a flash file.

According to the present invention, all of the desired object headers can be deleted in only one header block without searching the entire system. Therefore, it is possible to quickly and securely delete a flash file.

According to the present invention, a binary tree, which is composed of nodes having binary values associated with a file ID, is used when searching a header block. Accordingly, it is possible to quickly search a header block.

BRIEF DESCRIPTION OF THE DRAWINGS

FIGS. 4A to 4C are conceptual diagrams illustrating an allocation of a header block when a flash file is deleted;

DESCRIPTION OF THE PREFERRED EMBODIMENTS

Hereinafter, the preferred embodiments of the present invention will be described in detail with reference to the accompanying drawings.

Figure 1:
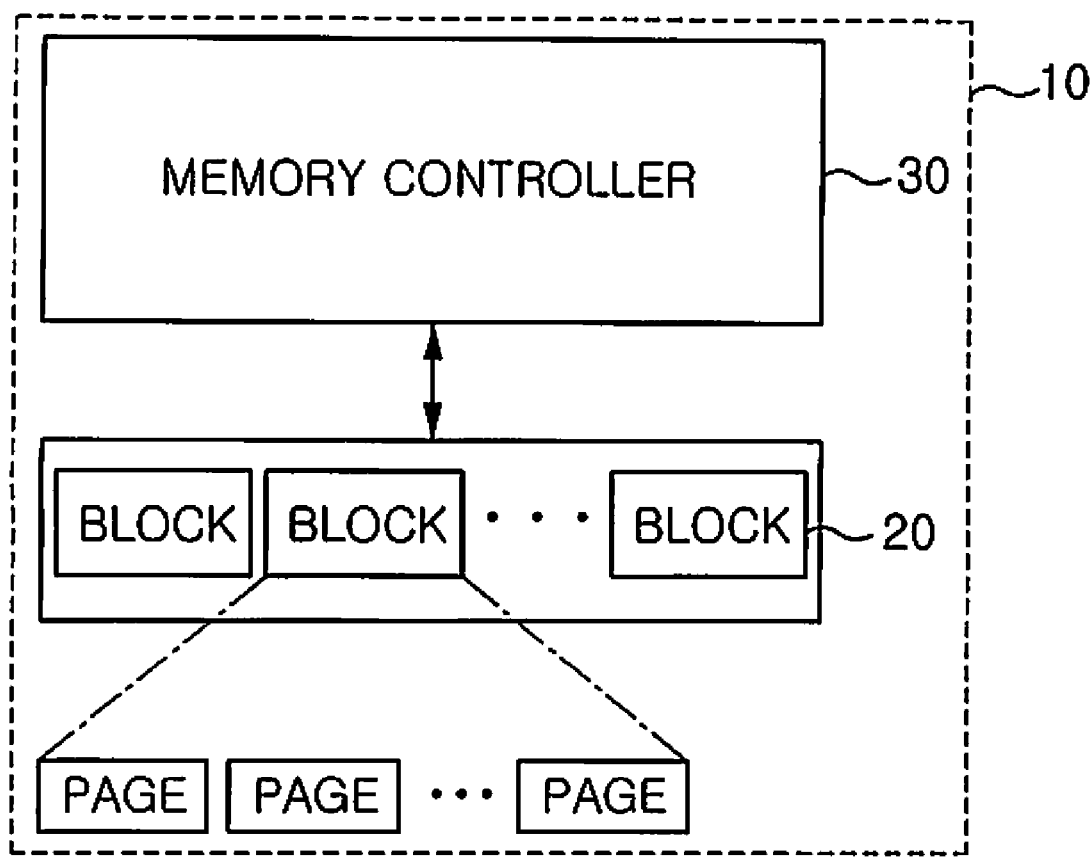
FIG. 1 is a diagram illustrating the structure of a flash memory device according to an embodiment of the present invention.

FIG. 1 shows a flash memory device 10 that has a function of securely deleting a flash file in accordance with an embodiment of the present invention. The flash memory device 10 includes a flash memory 20 and a memory controller 30. When the flash memory device 10 is a UBS flash drive, the flash memory device 10 further includes a connector that is used to exchange files and control signals between an external device and the flash memory device.

The flash memory 20 includes a plurality of memory blocks that store flash files, and may be, for example, a NAND gate flash memory, but the present invention is not limited thereto. Each of the memory blocks may include 32 pages each of which has a size of 512 bytes.

The memory controller 30 controls the flash memory 20 such that the memory blocks are divided into data blocks and header blocks. Data as actual contents of a flash file is stored in each of the data blocks. An object header having metadata, which includes a file ID of a flash file and a location of a data block where data of the corresponding flash file is stored, is stored in each of the header blocks.

Further, the memory controller 30 encrypts data of the flash file and stores the encrypted data in the data block, and stores an object header of the corresponding flash file, which includes a decryption key to decrypt the encrypted data, in the header block. When the flash file is deleted, only the decryption key of the corresponding flash file is deleted from the header block. As a result, it is possible to quickly and securely delete the flash file.

Hereinafter, the operation of the memory controller 30 that generates/changes the flash file and deletes the flash file will be described in detail.

1. Binary Tree Used to Search a Header Block

Figure 2:
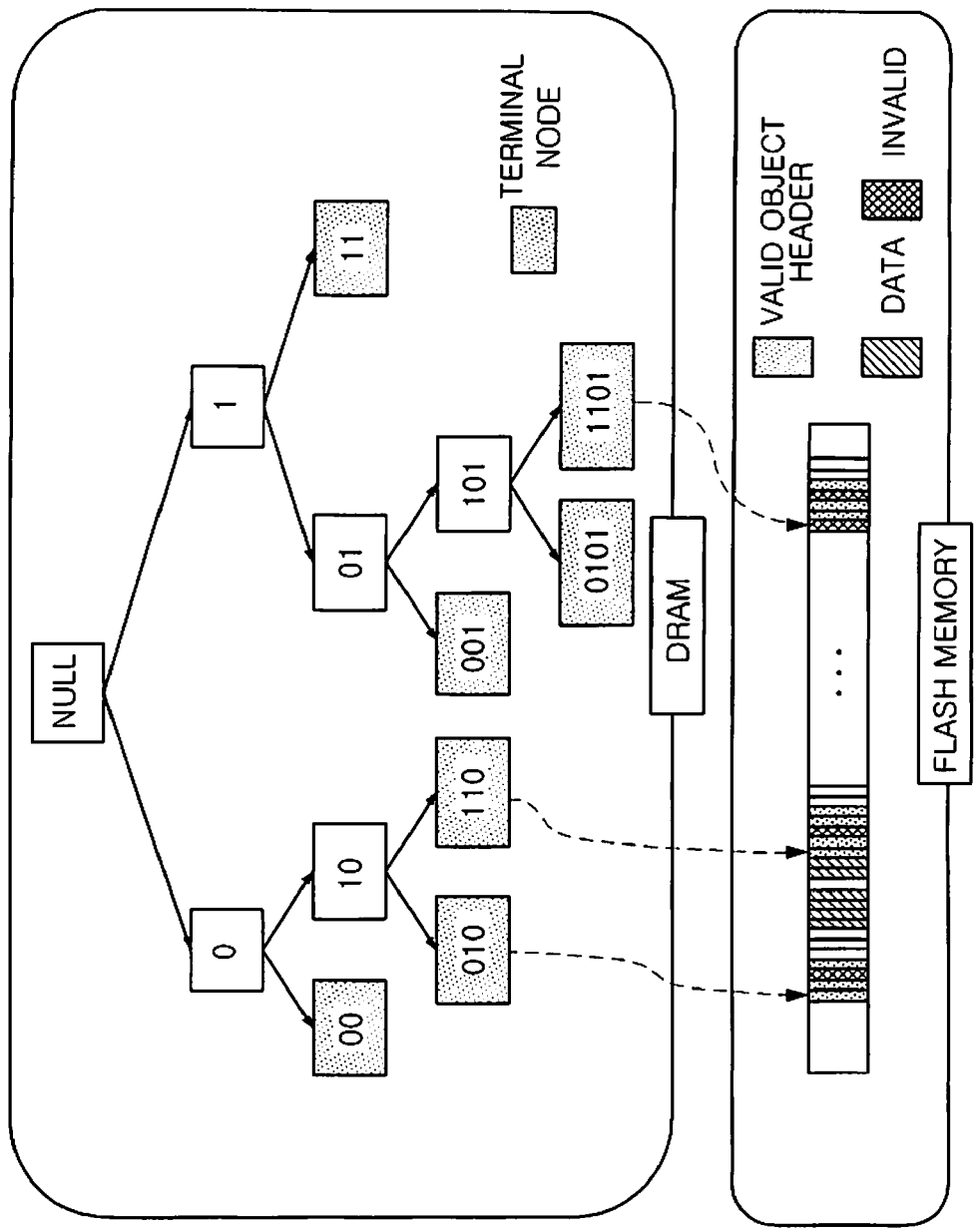
FIG. 2 is a diagram illustrating the structure of a binary tree that is used when a header block is searched.

FIG. 2 shows a binary tree that is used for a header block searching operation performed by the memory controller 30. The binary tree is maintained in an internal memory, such as a DRAM. Specifically, the binary tree is used to search a header block where a newly generated object header is to be stored and a header block where an object header to be deleted is located.

An uppermost layer of the binary tree has a NULL value. At a left child node of a parent node, 0 is added to the left of a binary value of the parent node. At a right child node thereof, 1 is added to the left of the binary value of the parent node. In accordance with the above rule, all nodes of the binary tree are formed, and each node can be easily searched. At this time, the locations of the child nodes at the left and right may be changed.

The binary value that is displayed at each of the nodes of the binary tree is a pointer that indicates a location of each header block in the flash memory 20, and corresponds to n least significant bits (LSB) of a file ID. The header block exists at a location that is indicated by a pointer of a terminal node in the flash memory 20.

For example, a terminal node '010' indicates a header block that stores an object header that corresponds to a file where an LSB of a file ID is '010'. Accordingly, when a newly generated object header is stored in a header block, n LSBs of the file ID need to be the same as a binary value of a terminal node whose depth is n. That is, the object header, which corresponds to a file where the LSB of the file ID IS '010', is stored in a header block that is indicated by a terminal node that has a binary value of '010'.

However, when a storage space of the header block is insufficient, a block managing unit 11 generates child nodes '0010' and '1010' of the terminal node '010', and generates two new header blocks at locations of the flash memory 20 that are indicated by the generated child nodes. The object headers that are stored in the header block indicated by the terminal node '010' and the newly generated object headers are separately stored in the two new header blocks. The header block that is indicated by the terminal node '010' is deleted.

Meanwhile, a header block that is indicated by a node '10' does not exist in the flash memory. The reason is because the header block indicated by the node '10' is deleted when the child nodes '010' and '110' of the node '10' are generated, which will be described in detail below.

By configuring the binary tree as stated above, the object headers having the same file ID are stored in the same header block. Accordingly, since only one header block that stores an object header related to the flash file to be deleted needs to be searched in accordance with the binary tree rule, it is possible to quickly search and delete the header blocks.

In the description below, a terminal node having a binary value "X" is represented by a "terminal node X", and a header block that is indicated by the terminal node X is represented by a "header block X".

2. Allocation Process of Header Blocks According to a File Generation/Modification A process of allocating a newly generated object header to a corresponding header block will be described with reference to FIG. 3. In response to a storage command of a newly generated flash file, the memory controller 30 executes the following "OBJECT_HEADER_ADD operation algorithm" and performs an allocation process of a header block. This algorithm is generated when a new file is generated or an existing file is modified.

[OBJECT_HEADER_ADD Operation Algorithm]

- when a file "/foo/bar" is modified or created, do the following: -

1: $f_{ID}$ = getFileID("/foo/bar");
2: $n_{ID}$ = getLeafNode($f_{ID}$);
3: $b_{ADDR}$ = findCorrespondingBlock($n_{ID}$);
4: $p_{ADDR}$ = allocPageOnBlock($b_{ADDR}$);
5: IF $p_{ADDR}$ != NULL THEN
6:   writeHeaderToPage($p_{ADDR}$);
7: ELSE
8:   $s_{ADDR}$ = saveHeaderBlock($b_{ADDR}$);
9:   deleteHeaderBlock($b_{ADDR}$);
10:  freeBlock($n_{ID}$);
11:  removeInvalidHeaders($s_{ADDR}$);
12:  $n_{VALID}$ = countNumberOfHeaders($s_{ADDR}$);
13:  IF $n_{VALID}*2 \geq n_{PAGE\_FOR\_BLOCK}$ THEN
14:    createLeafNodes($n_{ID}$, &$n_X$, &$n_Y$);
15:    $b_X$ = allocBlock($n_X$);
16:    $b_Y$ = allocBlock($n_Y$);
17:    divideHeadersToBlocks($s_{ADDR}$, $b_X$, $b_Y$);
18:  ELSE
19:    $b_{ADDR}$ = allocBlock($n_{ID}$);
20:    copyHeadersToBlock($s_{ADDR}$, $b_{ADDR}$);
21:  END IF
22: END IF As shown in FIG. 2, in a state where the binary tree is configured, when a file where a file ID is "11010010" is generated, the above algorithm is executed in accordance with the following sequence. Data of the file where the file ID is "11010010" is encrypted, and a decryption key and the file ID are included in an object header of the corresponding file.

(1) A file ID "11010010" of a file to be generated is obtained.

(2) A terminal node is searched, which has a depth of n and has the same binary value as n LSBs of a file ID. This search follows the nodes of the binary tree in the order of LSB values of the file ID until the terminal node is discovered, starting from a route node NULL (refer to FIG. 3A).

When the file ID is "11010010", a node '0', which has the same binary value as one LSB '0' of the file ID, is first searched among the nodes whose depth is 1. Since the node '0' is not the terminal node, the node '10, which has the same binary value as two LSBs '10' of the file ID, is searched among the child nodes of the node '0'. However, since the node '10' is not the terminal node, a node '010', which has the same binary value as three LSBs '010' of the file ID, is searched among the child nodes of the node '10'. Since the node '010' does not have a child node, the node '010' becomes a terminal node for the file ID "11010010".

(3) It is confirmed whether a space available for a new object header exists in the header block 010 that is indicated by the terminal node 010 discovered in (2). If there is available space, an object header of a file that has a file ID "11010010" is stored in the header block 010 and the operation is finished.

(4) If there is no available space, the header block 010 is copied into the DRAM. The header block 010 that is copied into the DRAM is deleted from the flash memory 20 (refer to FIG. 3B).

Figure 3A:
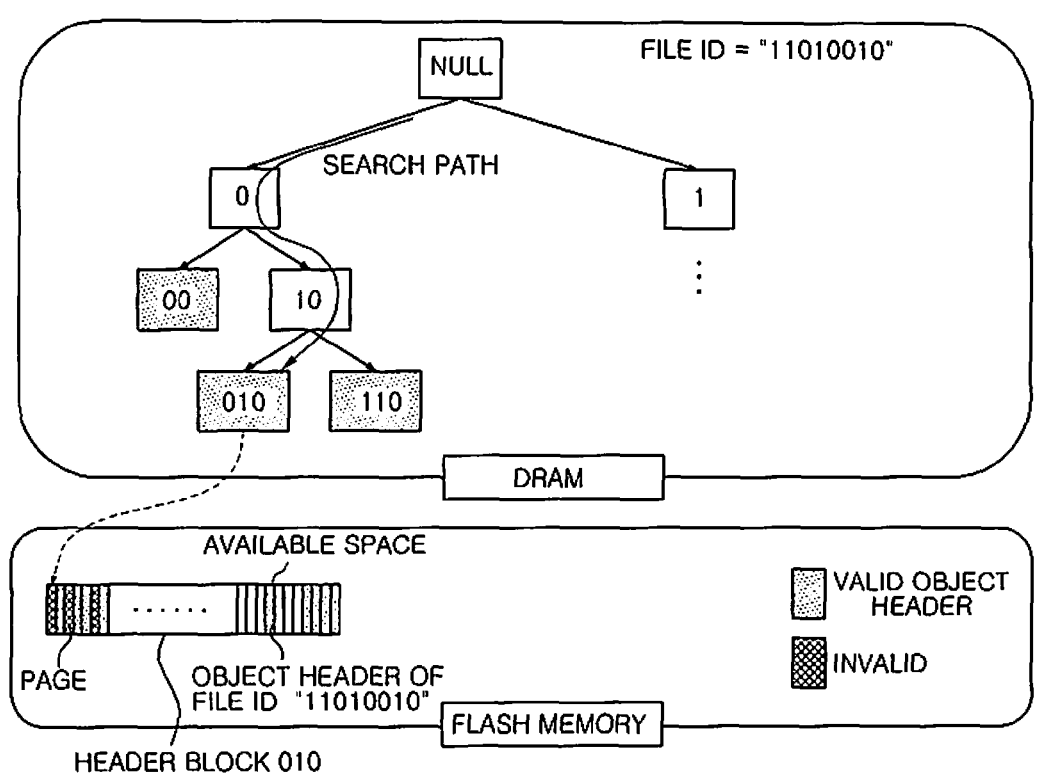
FIGS. 3A to 3D are conceptual diagrams illustrating an allocation of a header block when a flash file is generated and changed.
Figure 3B:
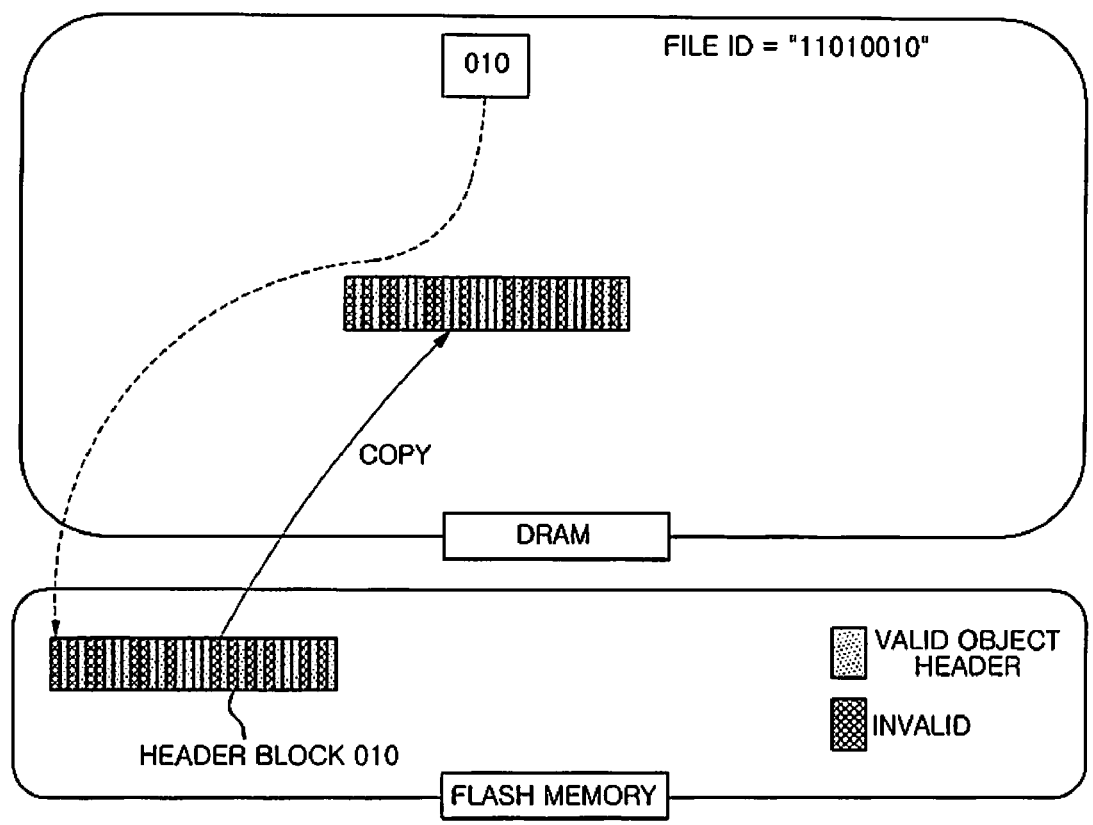
Figure 3C:
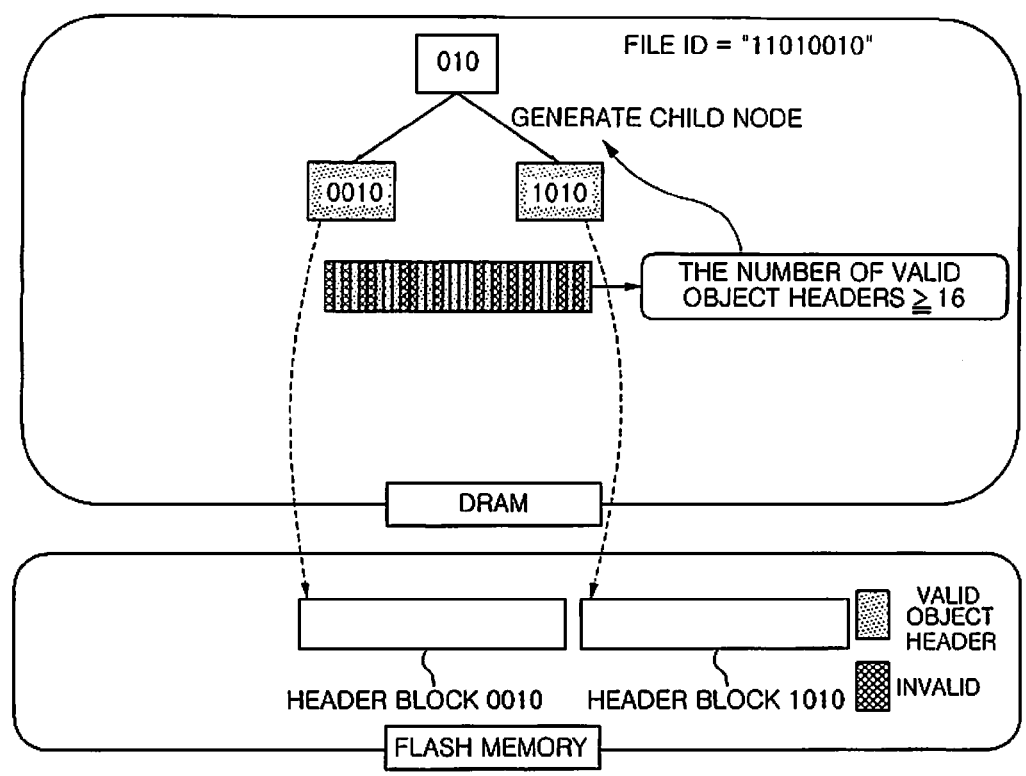
Figure 3D:
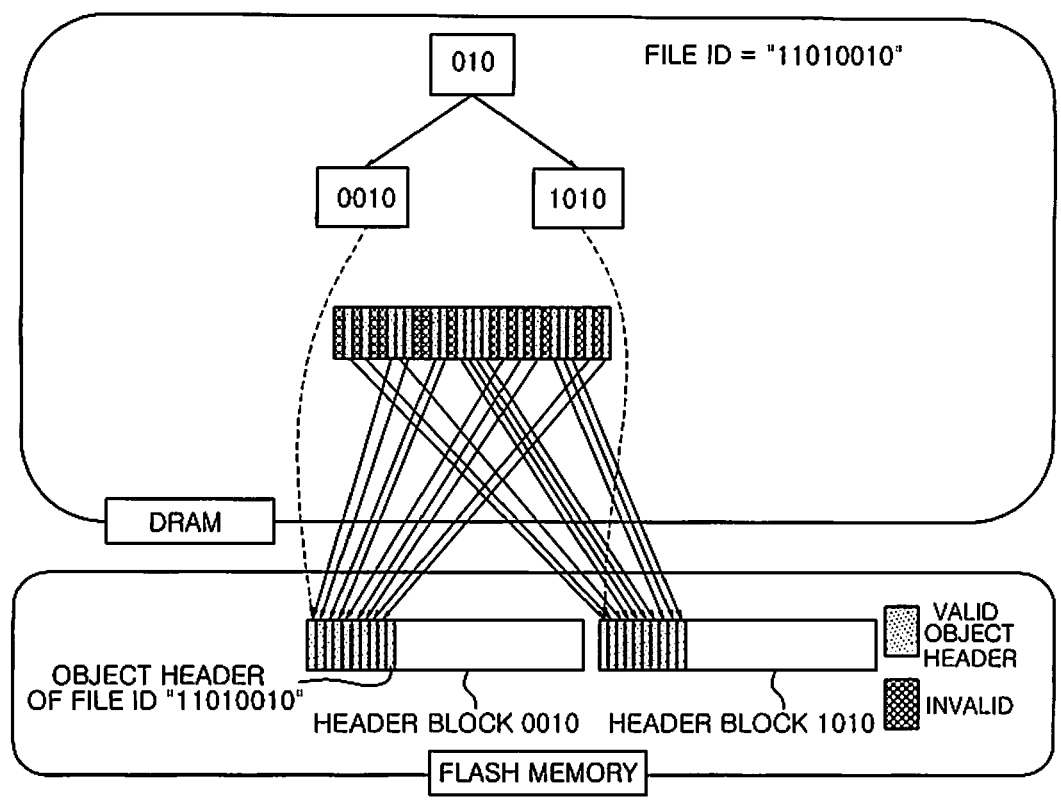

(5) The number of valid object headers in the header block 010 is counted (refer to FIG. 3C).

(6) As the calculation result of (5), if the number of valid object headers is equal to or larger than the predetermined number (for example, half) of pages in the header block 010, terminal nodes 0010 and 1010 that are two child nodes of the terminal node 010 are generated in accordance with the above-described binary tree rules, and the header blocks 0010 and 1010 are allocated to the flash memory 20 (refer to FIG. 3C).

(7) The valid object headers in the header block 010 and an object header of a file that has a file ID of "11010010" are separately stored (for example, in two equal parts) in the header block 0010 and header block 1010 on the basis of the file ID. That is, the object headers of a file where an LSB of a file ID is '0010' are stored in the header block 0010, and the object headers of a file where an LSB of a file ID is '1010' are stored in the header block 1010. Accordingly, an object header of a file that has a file ID "11010010" is stored in the header block 0010 (refer to FIG. 3D).

(8) As the calculation result of (5), if the number of valid object headers does not exceed half of the number of pages in the header block 010, the header block 010 that is deleted in (4) is reallocated to the flash memory 20, and the existing valid object headers and the object header of the file that has the file ID "11010010" are stored in the header block 010.

(9) The header block that is copied in (4) is deleted from the DRAM.

When data of a file is modified, first, the object header of the corresponding file that is stored in the header block is set as an invalid header. Then, when there is available space in the header block, the modified object header is allocated to the available space of the header block by the process of (3). When there is no available space in the header block, the header block is allocated by the processes of (5) to (8).

3. Allocation Process of a Header Block when a File is Deleted

An allocation process of a header block when a flash file is deleted will be described with reference to FIG. 4. The memory controller 30 executes the following "OBJECT_HEADER_DEL operation algorithm" in response to a deletion command of a specific flash file that is stored in the flash memory 20.

- when a file "/foo/bar" is to be securely deleted,
  do the following: -

1: $f_{ID}$ = getFileID("/foo/bar");
2: $n_{ID}$ = getLeafNode($f_{ID}$);
3: $b_{ADDR}$ = findCorrespondingBlock($n_{ID}$);
4: $s_{ADDR}$ = saveHeaderBlock($b_{ADDR}$);
5: deleteHeaderBlock($b_{ADDR}$);
6: freeBlock($n_{ID}$);
7: invalidateHeadersByFileID($f_{ID}$, $s_{ADDR}$);
8: removeInvalidHeaders($s_{ADDR}$);
9: $b_{ADDR}$ = allocBlock($n_{ID}$);
10: copyHeadersToBlock($s_{ADDR}$, $b_{ADDR}$);

When the file generated by the OBJECT_HEADER_ADD operation algorithm and having a file ID of "11010010" is deleted, the "OBJECT_HEADER_DEL operation algorithm" is executed in accordance with the following sequence. Data of the file that has the file ID of "11010010" is encrypted, and a decryption key is included in an object header of the corresponding file. It is assumed that the object header of the file ID "11010010" is stored in the header block 010.

(1) A file ID "11010010" of a file to be securely deleted is obtained.

(2) A terminal node is searched, which has a depth of n and has the same binary value as n LSBs of a file ID. This search follows the nodes of the binary tree in the order of LSB values of the file ID until the terminal node is discovered, starting from a route node NULL. In this way, the header block 010 is searched.

(3) The header block 010 that is searched in (2) is copied into the DRAM. The header block 010 that is copied into the DRAM is deleted from the flash memory 20 (refer to FIG. 4A).

Figure 4B:
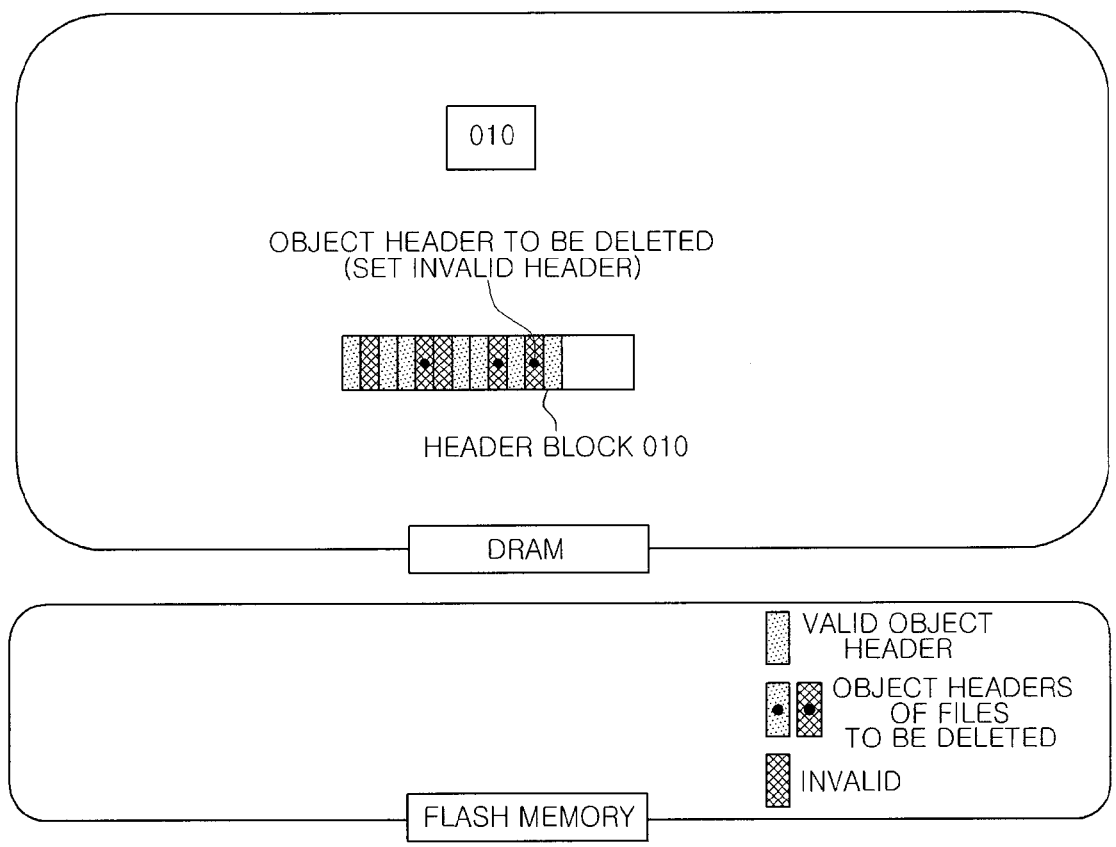

(4) An object header that has a file ID "11010010" is set as an invalid header, among the object headers, which are stored in the header block 010 in the DRAM (refer to FIG. 4(B)).

Figure 4C:
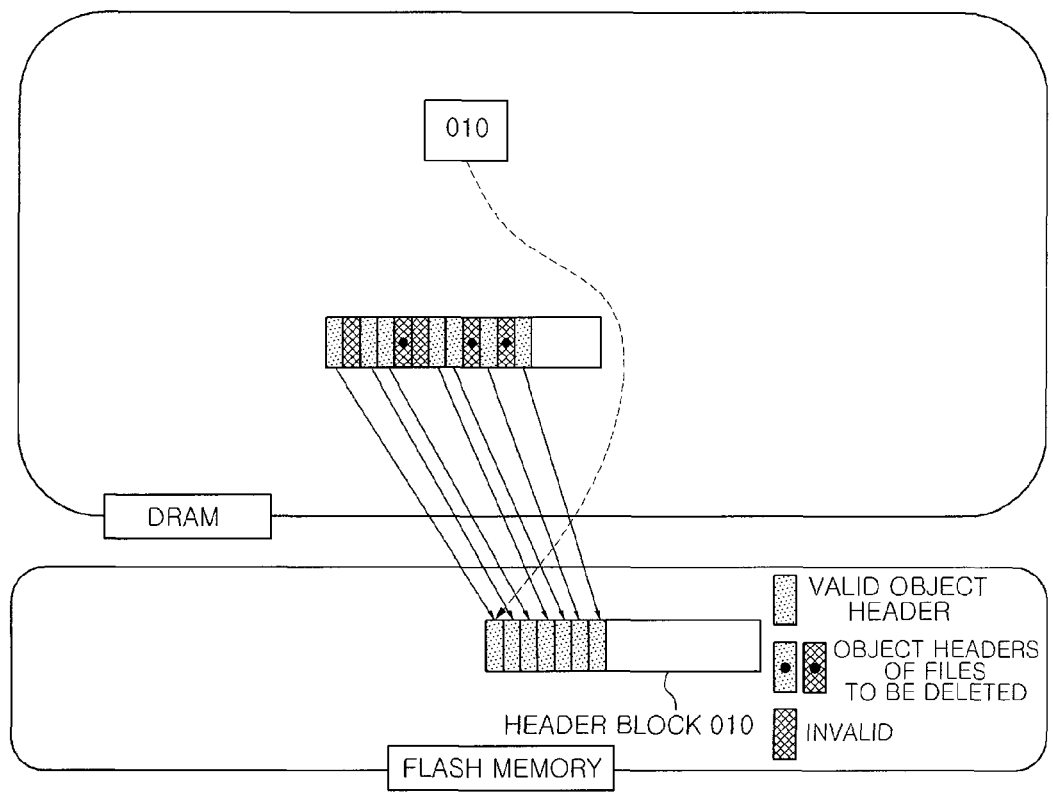

(5) The header block 010 that is deleted in (3) is reallocated to the flash memory 20, and all of the valid object headers that are stored in the header block 010 in the DRAM are stored in the header block 010 reallocated to the flash memory 20 (refer to FIG. 4C).

(6) The header block 010 that is copied in (3) is deleted from the DRAM.

The object header that includes a data decryption key of a file ID "11010010" is set as an invalid header in (4) and deleted in (6). Therefore, even though data of the corresponding file remains in the flash memory 20, the corresponding data cannot be recovered.

Figure 5A:
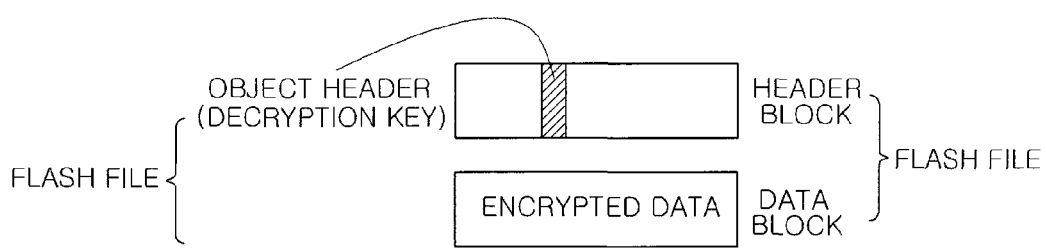
FIG. 5 is a flowchart illustrating a method of securely deleting a flash file according to an embodiment of the present invention.

FIG. 5 shows a flowchart of a method of securely deleting a flash file in accordance with an embodiment of the present invention. As shown in FIG. 5A, data of the flash file is encrypted and stored in the data block of the flash memory 20. The decryption key is included in the object header and stored in the header block of the flash memory 20.

Figure 5B:
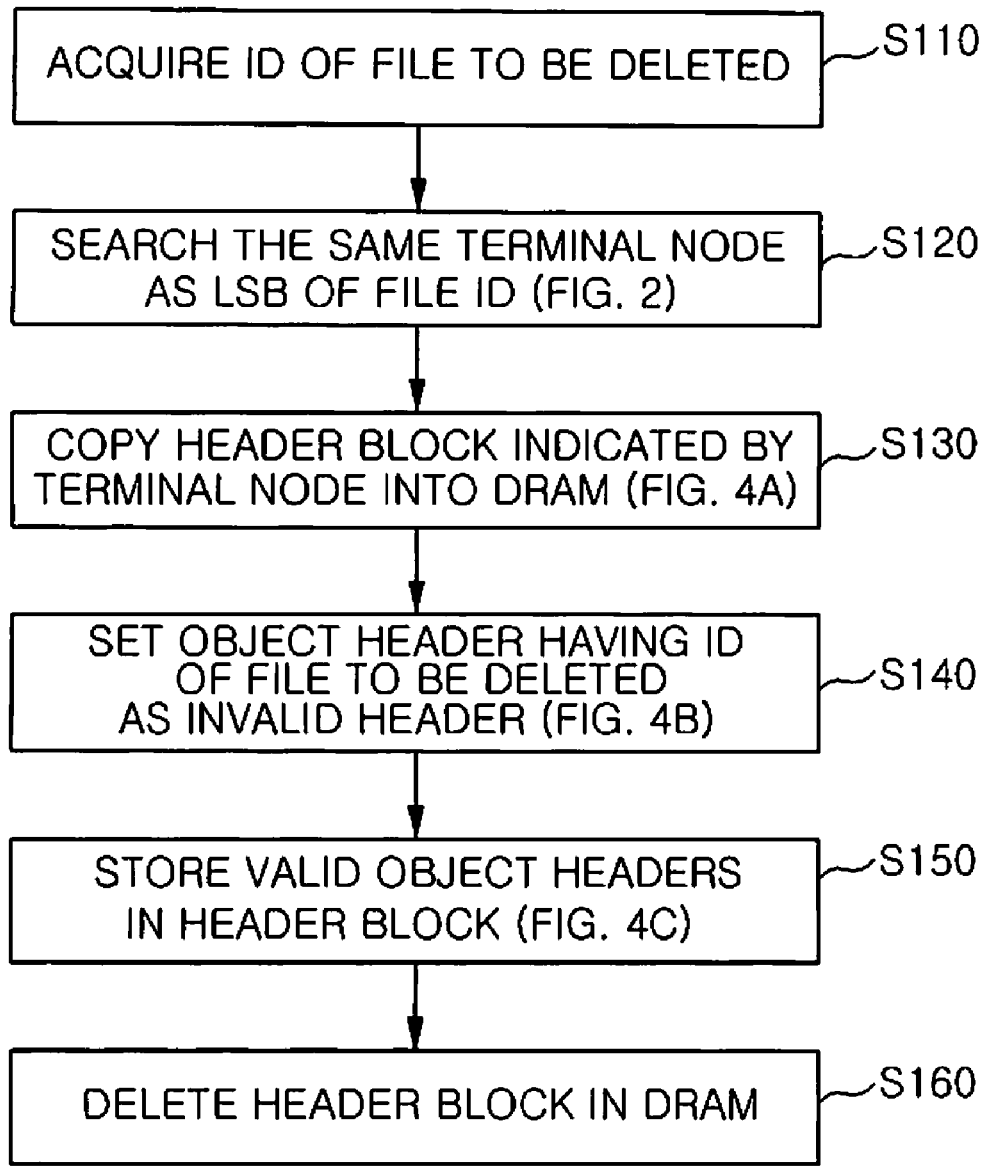

Referring to the flowchart that is shown in FIG. 5B, first, an ID of a flash file to be deleted is obtained (S110). Then, a terminal node, which has a depth of n and the same binary value as n LSBs of a file ID, is searched (S120). This search follows the nodes of the binary tree in the order of LSB values of the file ID until the terminal node is discovered, starting from a route node NULL. Then, the header block that is indicated by the terminal node searched in Step S120 is copied into the DRAM, and the header block that is copied into the DRAM is deleted from the flash memory 20 (Step S130). Among the object headers that are stored in the header block of the DRAM, an object header that has a file ID of a file to be deleted is set as an invalid header (Step S140). The header block that is deleted in Step S130 is reallocated to the flash memory 20, and all of the valid object headers that are stored in the header block of the DRAM are stored in the header block reallocated to the flash memory 20 (S150). The header block that is copied in Step S130 is deleted from the DRAM (S160).

Figure 6:
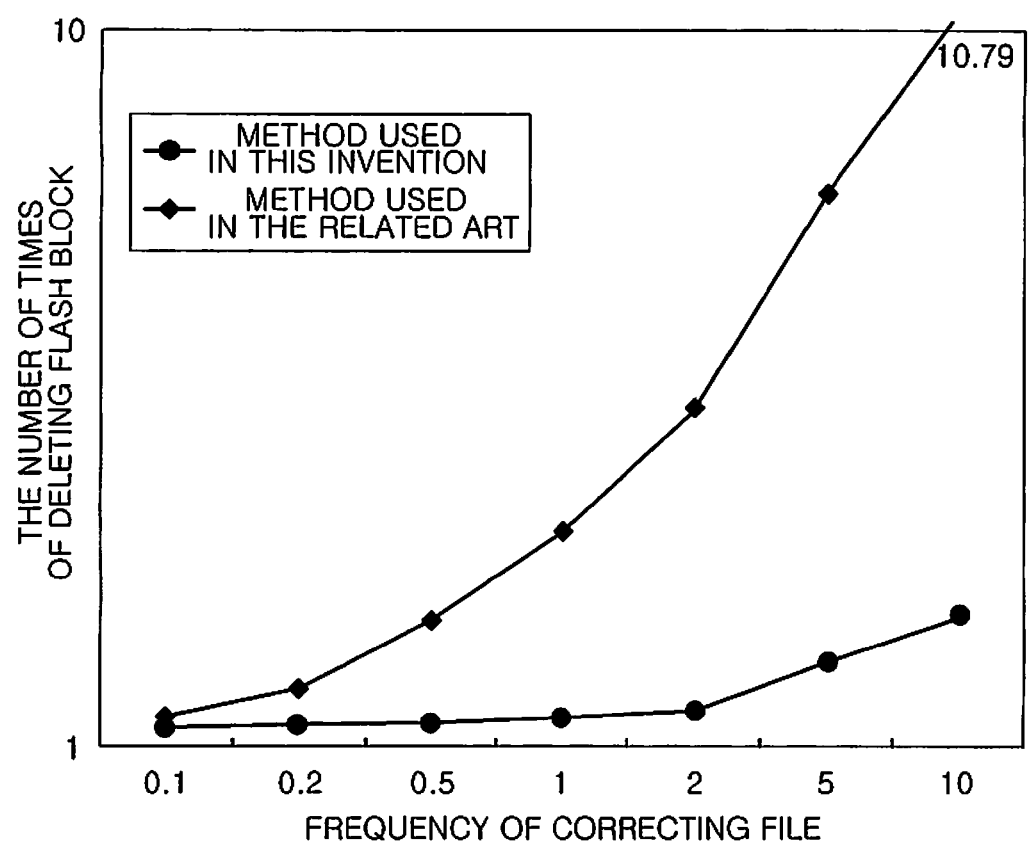
FIG. 6 is a graph illustrating an experimental result according to an embodiment of the present invention.

The graph of FIG. 6 shows an experimental result of a method of securely deleting a file in accordance with an embodiment of the present invention and a method of securely deleting a file in accordance with the related art.

In this embodiment, the memory controller 30 divides memory blocks into data blocks and header blocks and manages the memory blocks. The data blocks store encrypted data and the header blocks store a decryption key that is needed to decrypt the encrypted data. The object headers of the flash file that has the same file ID are stored in the same header block. In response to a deletion command for the flash file, the memory controller 30 deletes all of the object headers in the header block corresponding to the file. In the example according to the related art, in response to the deletion command for the flash file, the memory controller searches the memory blocks that are scattered over the entire flash memory and deletes the memory blocks.

According to the experimental result of FIG. 6, in the method of securely deleting a file in accordance with the related art, the number of times of deleting the memory block is increased almost proportional to a frequency of correcting a flash file. In the method of securely deleting a file in accordance with the embodiment of the present invention, even if the frequency of correcting a file is increased, the number of times of deleting the memory block is rarely increased. Accordingly, in the flash memory that has a large amount of overhead for a deletion operation of the memory block, it is preferable to use the method of securely deleting a file in accordance with the embodiment of the present invention.

The above-described embodiment of the present invention has been described with reference to the specific structure and the accompanying drawings. However, the present invention is not limited thereto, and various changes and modifications can be made without departing form the spirit and scope of the present invention.

For example, the structure where a binary tree is configured with respect to n most significant bits (MSB) of the file ID is also included in the scope of the present invention. In this case, a binary value where 0 is added to the right of the binary value of the parent node is allocated to the left child node, and a binary value where 1 is added to the right of the binary value of the parent node is allocated to the right child node. At this time, the locations of the child nodes at the left and right side may be changed.

What is claimed is:

1. A flash memory device comprising:
   a flash memory that comprises memory blocks to store a flash file; and
   a memory controller configured to control the flash memory, such that data blocks of the memory blocks store encrypted data of the flash file and header blocks thereof store object headers each including a decryption key used to decrypt the encrypted data,
   wherein the memory controller is configured to delete the object headers each including the decryption key used to decrypt the encrypted data from the header block in response to a deletion command of the flash file that includes the encrypted data, and wherein the memory controller stores an object header of a newly generated flash file in an available space of the header block in response to a storage command of the newly generated flash file.

2. The flash memory device of claim 1,
wherein, in response to the deletion command, the memory controller is configured to copy a header block, which contains an object header including a decryption key to be deleted, to a temporary storage device, delete the header block from the flash memory, set the object header including the decryption key to be deleted in the copied header block as invalid, reallocate the deleted header block to the flash memory, and store valid object headers among the object headers of the copied header block in the reallocated header block.

3. The flash memory device of claim 1,
wherein the memory controller stores the object headers of the flash file having the same file ID in the same header block.

4. The flash memory device of claim 1,
wherein the memory controller configures a binary tree in which a node having a depth of n has a binary value indicating n least significant bits (LSBs) of a file identification (ID) of the flash file and a binary value of a terminal node indicates a location of the header block in the flash memory, and
wherein the memory controller stores an object header of the flash file that has the binary value of the terminal node as an LSB of the file ID in the header block indicated by the terminal node, and searches the binary tree in a depth direction to search a header block including an object header to be deleted.

5. The flash memory device of claim 4,
wherein the memory controller configures the binary tree such that two child nodes have binary values that are obtained by adding "0" and "1" to the left of a binary value of a parent node thereof, respectively.

6. The flash memory device of claim 1,
wherein the memory controller configures a binary tree in which a node having a depth of n has a binary value indicating n most significant bits (MSBs) of a file identification (ID) of the flash file and a binary value of a terminal node indicates a location of the header block in the flash memory, and
wherein the memory controller stores an object header of the flash file that has the binary value of the terminal node as an MSB of the file ID in the header block indicated by the terminal node, and searches the binary tree in a depth direction to search a header block including an object header to be deleted.

7. The flash memory device of claim 6,
wherein the memory controller configures the binary tree such that two child nodes have binary values that are obtained by adding "0" and "1" to the right of a binary value of a parent node thereof, respectively.

8. The flash memory device of claim 1,
wherein, when there is no available space in the header block, the memory controller separately stores valid object headers and the object header of the newly generated flash file in two new header blocks if the number of the valid object headers in a corresponding header block is equal to or larger than a predetermined number, and further stores the valid object headers and the object header of the newly generated flash file in one header block that is newly allocated to the flash memory if the number of valid object headers is smaller than the predetermined number.

9. The flash memory device of claim 1,
wherein the memory controller configures a binary tree in which a node having a depth of n has a binary value that indicates n LSBs or MSBs of a file ID of a flash file and a binary value of a terminal node indicates a location of a header block in the flash memory,
wherein the memory controller stores an object header of a flash file that has the binary value of the terminal node as the LSB or MSB of the file ID in a header block indicated by the terminal node, in response to a storage command of a newly generated flash file,
wherein, when there is no available space in the indicated header block, the memory controller deletes the header block from the flash memory after copying the header block to a temporary storage device,
wherein, if the number of valid object headers in the copied header block is equal to or larger than a predetermined number, the memory controller generates two child nodes of the terminal node, allocates two header blocks indicated by the two generated child nodes to the flash memory, and separately stores the valid object headers and the object header of the newly generated flash file in the two header blocks, and
wherein, if the number of valid object headers in the copied header block is smaller than the predetermined number, the memory controller reallocates the deleted header block to the flash memory and stores the valid object headers and the object header of the newly generated flash file in the reallocated header block.

10. A method of securely deleting a flash file, comprising:
storing encrypted data of a flash file in data blocks of a flash memory and storing object headers each including a decryption key used to decrypt the encrypted data in header blocks thereof;
deleting an object header including a decryption key used to decrypt encrypted data to be deleted from the header blocks in response to a deletion command of the flash file that includes the encrypted data; and
storing an object header of a newly generated flash file in an available space of the header block, in response to a storage command of the newly generated flash file.

11. The method of claim 10,
wherein the deleting of the object headers includes:
copying a header block that contains an object header including a decryption key to be deleted, to a temporary storage device;
deleting the header block from the flash memory;
setting the object header including the decryption key to be deleted in the copied header block as an invalid header;
reallocating the deleted header block to the flash memory; and
storing valid object headers among the object headers of the copied header block in the reallocated header block.

12. The method of claim 11,
wherein the storing of the valid object headers includes storing the object headers of the flash file having the same file ID in the same header block.

13. The method of claim 11,
wherein the storing of the valid object headers includes:
configuring a binary tree in which a node having a depth of n has a binary value indicating n LSBs of a file ID of the flash file and a binary value of a terminal node indicates a location of the header block in the flash memory; and
storing an object header of the flash file that has the binary value of the terminal node as an LSB of the file ID in the header block indicated by the terminal node, wherein copying the header block that contains the object header including the decryption key to be deleted includes searching the binary tree in a depth direction to search the header block including the object header to be deleted.

14. The method of claim 13,
wherein configuring the binary tree includes configuring the binary tree such that two child nodes have binary values that are obtained by adding "0" and "1" to the left of a binary value of a parent node thereof, respectively.

15. The method of claim 11,
wherein storing the valid object headers includes:
configuring a binary tree in which a node having a depth of n has a binary value indicating n MSBs of a file ID of the flash file and a binary value of a terminal node indicates a location of the header block in the flash memory; and
storing an object header of the flash file that has the binary value of the terminal node as an MSB of the file ID in the header block indicated by the terminal node, and
wherein copying the header block that contains the object header including the decryption key to be deleted includes searching the binary tree in a depth direction to search a header block including an object header to be deleted.

16. The method of claim 15,
wherein configuring the binary tree is configuring the binary tree such that two child nodes have binary values that are obtained by adding "0" and "1" to the right of a binary value of a parent node thereof, respectively.

17. The method of claim 10,
wherein, in the step of storing the object header of the newly generated flash file, when there is no available space in the header block, valid object headers and the object header of the newly generated flash file are separately stored in two new header blocks if the number of valid object headers in the corresponding header block is equal to or larger than a predetermined number, and the valid object headers and the object header of the newly generated flash file are stored in one header block that is newly allocated to the flash memory if the number of valid object headers is smaller than the predetermined number.

18. The method of claim 10,
wherein storing the encrypted data includes:
configuring a binary tree in which a node having a depth of n has a binary value that indicates n LSBs or MSBs of a file ID of a flash file and a binary value of a terminal node that indicates a location of a header block in the flash memory; and
storing an object header of a flash file that has the same binary value of the terminal node as the LSB or MSB of the file ID in a header block indicated by the terminal node, in response to a storage command of a newly generated flash file,
wherein, if there is no available space in the header block, the header block is deleted from the flash memory after copying the header block to a temporary storage device, if the number of valid object headers in the copied header block is equal to or larger than a predetermined number, two child nodes of the terminal node are generated, two header blocks indicated by the two generated child nodes are allocated to the flash memory, and the valid object headers and the object header of the newly generated flash file are separately stored in the two header blocks, and if the number of valid object headers in the copied header block is smaller than the predetermined number, the deleted header block is reallocated to the flash memory and the valid object headers and the object headers of the newly generated flash file are stored in the reallocated header block.

* * * * *